United States Patent
Gianaris et al.

(10) Patent No.: US 6,692,026 B2
(45) Date of Patent: Feb. 17, 2004

(54) POLYMER COMPOSITE STEERING COLUMN SUPPORT HOUSING AND ASSEMBLY

(75) Inventors: Nicholas James Gianaris, West Bloomfield, MI (US); Atiya M. Ahmad, Southfield, MI (US); Alan C. Johnston, Rochester Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 139 days.

(21) Appl. No.: 09/951,313

(22) Filed: Sep. 13, 2001

(65) Prior Publication Data

US 2003/0047929 A1 Mar. 13, 2003

(51) Int. Cl.$^7$ ............................................... B62D 1/11
(52) U.S. Cl. ........................ 280/779; 280/780; 74/492
(58) Field of Search ................... 280/779, 780, 280/777; 74/492, 493; 264/108

(56) References Cited

U.S. PATENT DOCUMENTS

| | | | |
|---|---|---|---|
| 4,274,646 A | | 6/1981 | Olligschlager et al. |
| 4,465,301 A | * | 8/1984 | Bongers et al. ............. 280/777 |
| 4,577,736 A | * | 3/1986 | Bongers et al. ............. 188/371 |
| 4,589,679 A | | 5/1986 | Wackerle et al. |
| 4,655,475 A | * | 4/1987 | Van Gelderen ............. 280/777 |
| 4,998,999 A | * | 3/1991 | Yuzuriha et al. ............ 280/777 |
| 5,035,307 A | * | 7/1991 | Sadeghi et al. ............. 188/372 |
| 5,356,179 A | * | 10/1994 | Hildebrandt et al. ........ 280/777 |
| 5,390,956 A | * | 2/1995 | Thomas ....................... 280/777 |
| 5,417,452 A | * | 5/1995 | Khalifa et al. ............... 280/777 |
| 5,497,675 A | * | 3/1996 | Brown et al. .................. 74/492 |
| 5,673,938 A | * | 10/1997 | Kaliszewski ................. 280/777 |
| 6,027,088 A | | 2/2000 | Stedman et al. |
| 6,237,956 B1 | | 5/2001 | Haba et al. |
| 6,398,259 B1 | | 6/2002 | Palmer et al. |
| 6,497,432 B2 | * | 12/2002 | Scheib et al. ................ 280/779 |
| 6,517,114 B1 | * | 2/2003 | Scheib et al. ................ 280/779 |
| 2001/0024035 A1 | | 9/2001 | Scheib et al. |

\* cited by examiner

*Primary Examiner*—Paul N. Dickson
*Assistant Examiner*—Deanna Draper
(74) *Attorney, Agent, or Firm*—John E. Kajander

(57) ABSTRACT

A steering column having a composite steering column support housing formed from a fiber reinforced matrix material. By layering the fibers within the matrix material of the support housing to a specific orientation, controlling fiber length, and controlling fiber and polymer type, the performance of the steering column can be manipulated to optimize NVH, structural stiffness, load path, crash energy management, mass balance, and cost. The column support housing contains at least one mounting hole for coupling to either an instrument panel or engine compartment wall. The column support housing may have a protruding region for stabilizing the steering column to the instrument panel when the support housing is mounted to the engine compartment wall. The mounting hole can also contain an elastomeric washer or a filler material for improving dampening characteristics, and further may have a circular fiber orientation immediately surrounding the mounting hole to further improve performance characteristics.

31 Claims, 4 Drawing Sheets

POLYMER COMPOSITE STEERING COLUMN SUPPORT HOUSING AND ASSEMBLY

TECHNICAL FIELD

The present invention relates generally to steering columns and more particularly to polymer composite steering column support housings and assemblies.

BACKGROUND

Steering column support housings are assemblies used to house and support the various sub-assemblies used to control and steer a vehicle. A support housing typically contains one or more of a steering column, a steering shaft, a tilt head, a telescoping mechanism, a key ignition, an interlock mechanism a wiring harness, and a column shift mechanism. The primary functions of a support housing are to: (1) support the steering column in a vehicle; (2) support the tilt and/or telescoping features of a steering column; and (3) provide for energy absorption in a crash. Support housings also provide, among other things, a place to mount a wiring harness, support column shift mechanisms, support interlock mechanisms, and support key ignitions.

Presently available support housing designs typically utilize a cast metal housing that is attached with brackets to a vehicle's instrument panel and/or cross car beam. Depending upon the type of steering column (rake, tilt, or telescoping) and the crash energy management scheme (breakaway or internal collapse) utilized, the attachment method of the steering column support housing to the vehicle structure varies greatly. For optimum performance, support housings are designed to meet weight, NVH (noise vibration and harshness), and crash energy management targets required of a steering column assembly.

Design trends with steering column support housings are very similar to other vehicle design features. Lighter, stronger, more easily constructed materials are being investigated to enhance current steering column support designs and to improve component features. This can lead to stronger, safer vehicles that can also meet fuel economy targets.

It is thus highly desirable to design a stiffer, but lighter, steering column support housing with improved crash energy management and NVH characteristics.

SUMMARY OF THE INVENTION

It is thus an object of the present invention to provide a fiber reinforced composite steering column support housing for use in a vehicle. The present invention will provide an inherently stiffer and lighter structure while improving NVH and crash energy management characteristics. Further, by utilizing composite material technology, the present invention allows for integrated tilt, telescoping and mounting features within the design.

The steering column support housing is formed by one of many composite manufacturing processing. This includes but is not limited to compression molding, injection molding, and bladder molding. The goal is to form a one-piece assembly having an integrated tilt, telescoping and mounting features.

Other objects and advantages of the present invention will become apparent upon considering the following detailed description and appended claims, and upon reference to the accompanying drawings.

DESCRIPTION OF THE PREFERRED EMBODIMENT(S)

Figure 1:
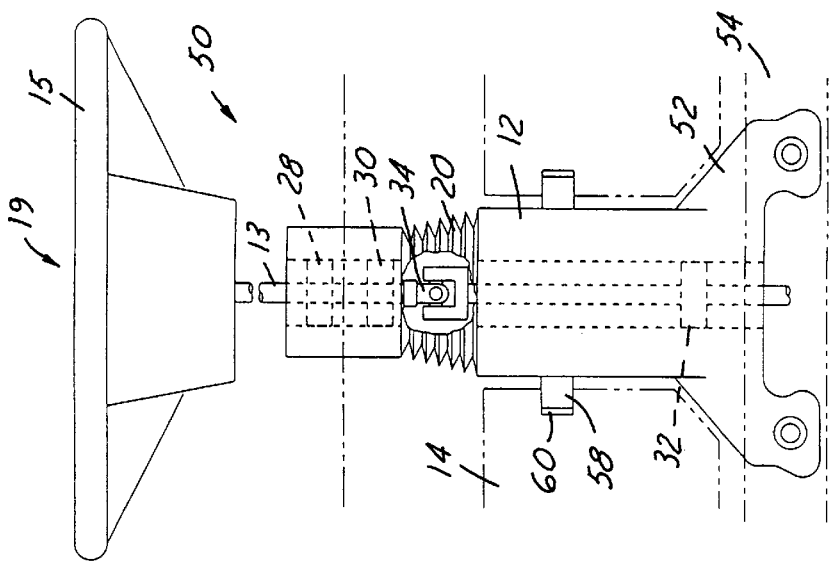
FIG. 1 shows an outer view of a polymer composite steering column according to one embodiment of the present invention.

In the following figures, the same reference numerals will be used to identify identical components in the various views. The present invention is illustrated with respect to a steering system, particularly suited for the automotive field. However, the present invention is applicable to various other uses that may require steering systems.

Referring now to FIG. 1, a composite steering column support housing 10 is shown. The housing has a composite column tube 12. At least one mounting structure 14 having a mounting hole 16 is used to mount the support housing 10 to the instrument panel, engine compartment wall, or other various structural components within the vehicle. The design, location, number, and size of these mounting structures 14 vary as a function of the mounting requirements and intended crash response of the vehicle.

The support housing 10 also has an open steering wheel end 22 and an intermediate shaft end 24 of a hollowed out center region 26 that is used to accommodate a steering mechanism 19 within the column tube 12. The steering mechanism 19 includes but is not limited to the steering shaft 13, a steering wheel 15, and various electrical cables and wires (steer-by-wire) as are well known in the art. The steering mechanism 19 is supported within the center region 26 by a plurality of bearings 28, 30, 32. The steering mechanism 19 also has a universal joint 34 located within an accordion region 20 that is coupled to the steering shaft 13. The universal joint 34 and accordion region 20 thus allows the steering mechanism 19 to tilt and/or telescope.

The column tube 12 and mounting structures 14 are comprised of strands of fibers 70 layered within a matrix material. The fibers 70 used are preferably continuous or short-length carbon, glass, or aramid fibers. However, other types of fibers 70 may be used that are contemplated in the art. For example, graphite fibers may be used. The matrix material that is used includes moldable thermosetting or thermoplastic polymers, metal, ceramic, or any other material that exhibit good strength and processability and meet recyclable regulatory demands. One preferred matrix material is a recyclable thermoplastic epoxy. The replacement of metal with composite materials with some of the above matrix materials decreases the weight of the steering column support housing 10. This results in better fuel economy in addition to other improved vehicle performance characteristics.

One important consideration is type of fiber 70 that is layered within the matrix material. For instance, if stiffness is a critical property for NVH or lash in specific loading directions, then high modulus fiber such as carbon or graphite is preferred. If strength is more important, then carbon or glass fibers are preferred. If toughness is critical, then aramid fiber alone or in combination with another kind of fiber 70 is preferred. Importantly, by combining different types of fiber 70 within the matrix material, a combination of these properties may be achieved.

Another important consideration is length of fiber 70 that is used in the layers of the matrix material. For certain NVH frequencies, long continuous fibers 70 are preferred. However, short fibers 70 may be preferred for other frequency nodes if there is a compromise between loading, NVH, or crash properties. For improved strength, short or long fibers 70 of carbon and glass are preferred. Of course, as above, a combination of short and long fibers 70 may give optimal performance.

Another important consideration in the steering column support housing 10 is the number of fiber 70 layers contained within the matrix material. As the number of layers of fiber 70 increases, performance characteristics generally improve. However, the amount of matrix material, and correspondingly the weight of the support housing 10 correspondingly increases, thereby decreasing cost effectiveness in terms of manufacturing costs, raw material costs, and fuel economy. In a preferred arrangement, approximately six layers of fiber 70 are stacked on top of each other within the matrix material and molded to form the column tube 12 and mounting structure 14 in the support housing 10.

Finally, fiber 70 orientation within various areas on the column tube 12 and mounting structure 14 are another important aspect. Fiber 70 strands are typically oriented adjacent and perpendicular to one another within an adjacent fiber 70 layer or adjacent and parallel to one another within an adjacent fiber 70 layer. By varying the orientation of the fiber 70 strands, and within different regions on the column tube 12 or mounting structure 14, various performance characteristics of the steering column may be easily manipulated. This is described below in FIGS. 4–7.

Preferably, the support housing 10 is fabricated as one single piece but it is contemplated that the column tube 12 and mounting structures 14 may be separately fabricated. In the former case, the column tube 12 and mounting structures 14 may be formed in a wide variety of process including but not limited to compression molding, bladder molding and injection molding. Compression molding is the preferred method when longer fibers or more continuous directed or aligned fibers are used.

In the latter case, the mounting structures 14 may be formed by injection molding using short length fibers, while the column tube 12 is formed using a compression molding process facilitating the use of longer or more continuous directed or aligned fibers. The column tube 12 and mounting structure 14 are then attached in a subsequent step by chemical means such as through the use of an adhesive or by physical means such as bolting.

Figure 2:
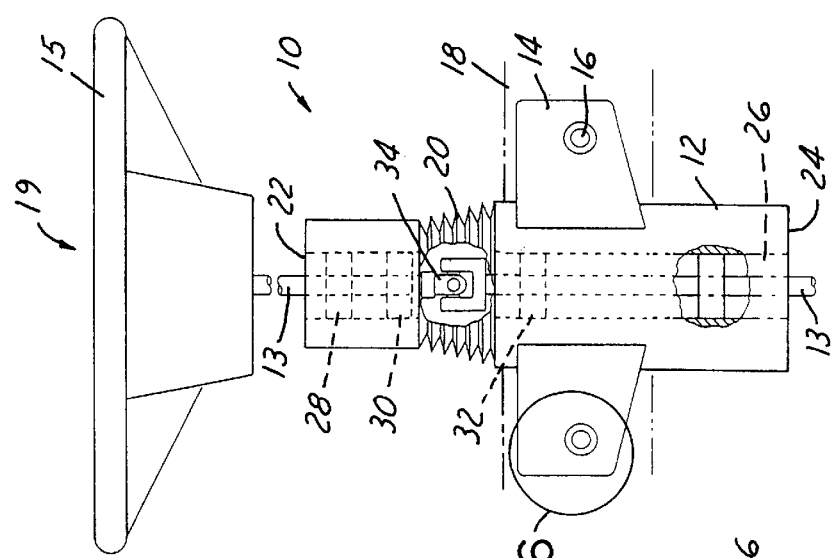
FIG. 2 shows an outer view and partial sectional view composite steering column according to one preferred embodiment of the present invention.
Figure 3:
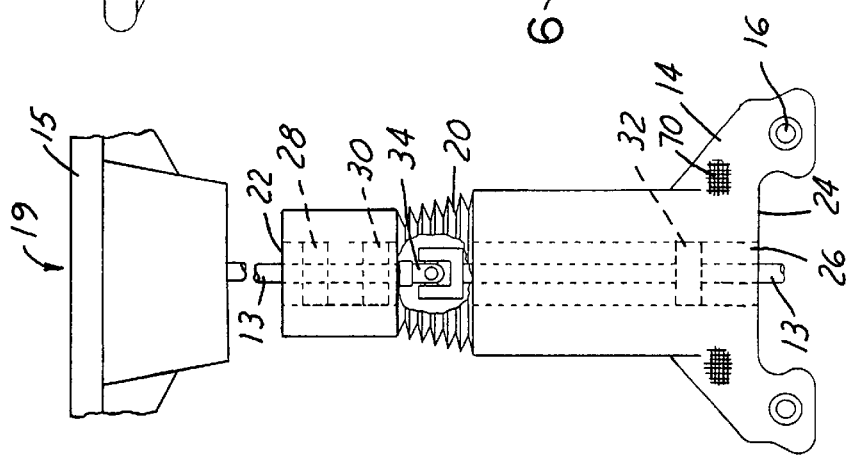
FIG. 3 shows an outer view and partial sectional view of a composite steering column according to another preferred embodiment of the present invention.

FIGS. 2 and 3 illustrate two preferred embodiments for the composite steering column support housing 10.

Figure 6:
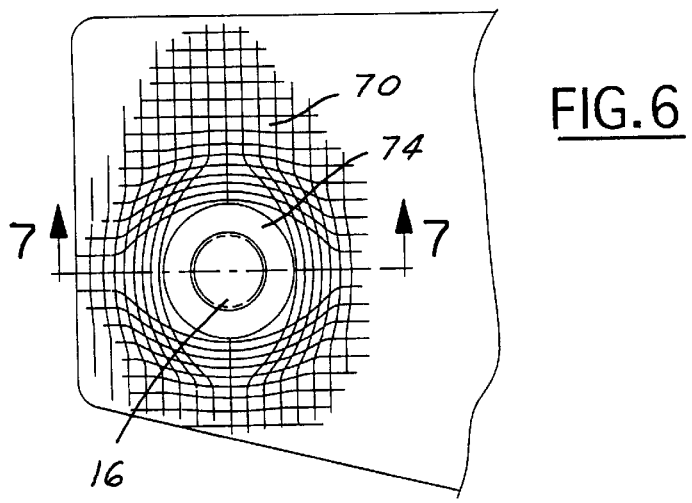
FIG. 6 is a close-up view of the mounting hole of FIG. 2 showing a preferable fiber pattern.
Figure 7:
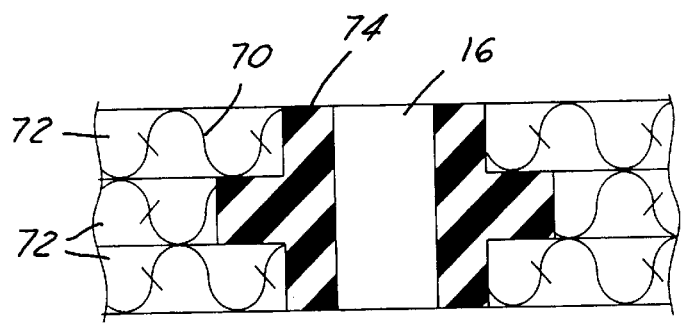
FIG. 7 is a section view of FIG. 6 taken along line 7—7.

Referring now to FIG. 2, a composite steering support housing 10 is depicted according to one preferred embodiment of the present invention. The steering support housing 10 generally has a hollow composite column tube 12 to house the steering shaft 13 and at least one mounting structure 14 having a mounting hole 16 that is used to attach the support housing 10 to the instrument panel 18. A more detailed description of the mounting hole 16 is illustrated in FIGS. 6 and 7 and discussed below.

The support housing 10 also has an open steering wheel end 22 and an intermediate shaft end 24 of a hollowed out center region 26 that is used to accommodate a steering mechanism 19 within the column tube 11. The steering mechanism 19 includes but is not limited to the steering shaft 13, a steering wheel 15, and various electrical cables and wires (steer-by-wire) as is well known in the art. The steering mechanism 19 is supported within the center region 26 by a plurality of bearings 28, 30, 32. The steering mechanism 19 also has a universal joint 34 located within the accordion region 20 that is coupled to the steering shaft 13. The universal joint 34 and accordion region 20 thus allows the steering mechanism 19 to tilt and/or telescope.

Referring now to FIG. 3, another preferred embodiment of the steering support housing 10 is shown. One major difference between the this embodiment and that of FIG. 2 is that the mounting structure 14 is designed to be attached the engine compartment wall 54 through the mounting hole 16, not to the instrument panel 18 as in FIG. 2. A more detailed description of the mounting hole 16 is illustrated in FIGS. 6 and 7 and discussed below.

In this embodiment, the steering column tube 12 has a comolded protruding region 58 that is coupled within a corresponding inlet 60 of the instrument panel 18. The protruding region 58 serves to stabilize the steering column support housing 10 within the instrument panel 18 during non-crash situations, yet breaks away during crash situations. A close-up view of the preferable fiber orientation of the protruding region 58 is depicted below in FIG. 8.

Figure 4:
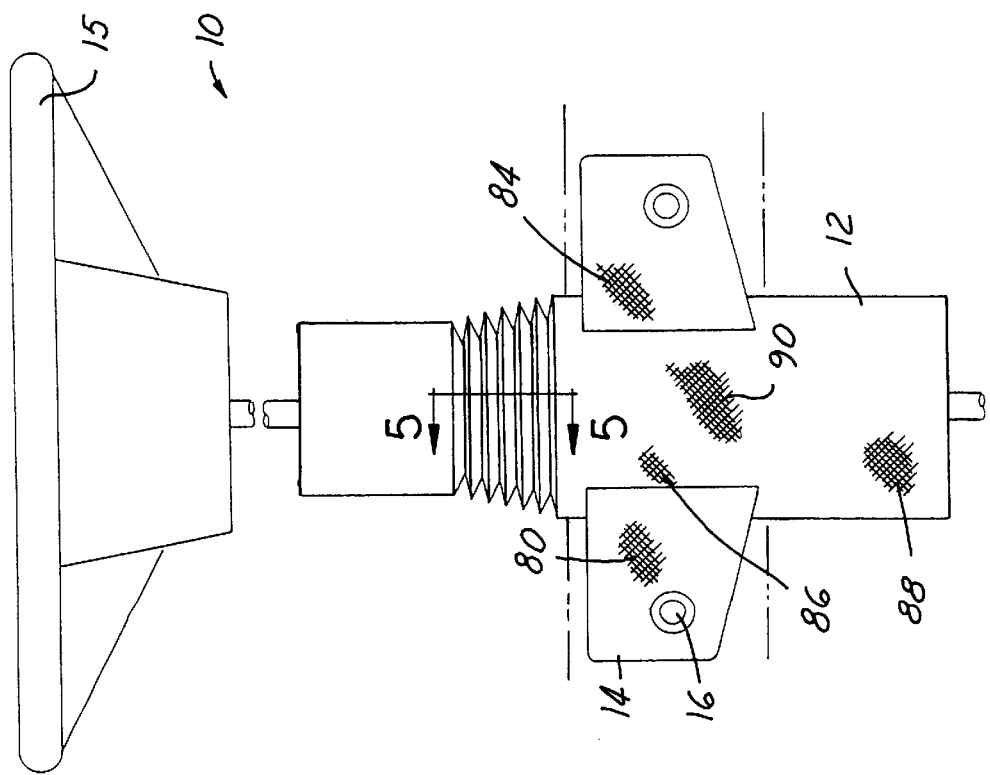
FIG. 4 shows an exemplary fiber pattern on various portions of the steering column of FIG. 2.

FIG. 4 illustrates a steering support housing 10 of FIG. 2 having a wide array of localized fiber 70 orientations within the matrix material on the column tube 12 and mounting structure 14 to illustrate various performance characteristics. FIG. 4 is not intended to be illustrative of a particular embodiment of the present invention, but instead to illustrate the principals involved in determining the performance aspects and capabilities of a polymer composite steering support housing 10 having different layered fiber 70 orientations.

For example, with regard to the mounting structure 14, zone 80, located above and the below mounting hole 16, could have fibers 70 oriented at zero and ninety degrees ("a 0/90 orientation") within adjacent fiber 70 layers defined relative to a plane 100 running through the matrix material of the column tube 12, wherein zero degrees is defined at a position closest to a steering wheel 11 and wherein one hundred eighty degrees is defined at a position farthest away from the steering wheel 15. For example, the fiber 70 orientation for consecutive fiber 70 layers having a 0/90 orientation could be $[0, 0, 90, 90, 0, 0]_n$, $[90, 90, 0, 0, 90, 90]_n$ or $[0, 90]_{ns}$, where n indicates the number of repeats and 0 or 90 indicates the orientation of one end of the fiber 70 located in closest proximity to the steering wheel 15 and where s indicates symmetry. This 0/90 orientation is preferable for crash energy management.

By rotating the fiber 70 orientation forty-five degrees to a +45/−45 orientation, as shown in zone 84, NVH is optimized due to increased axial stiffness. Similar to a 0/90 orientation, fiber layers having a 45/−45 orientation include [45, 45, −45, −45, 45, 45]$_{n_s}$ [−45, −45, 45, 45, −45, −45]$_n$ or [45, −45]$_{ns}$, where s is the number of repeats and s indicates symmetry.

With regard to the column tube 12, fibers 70 in zone 86 located adjacent to mounting structure 14 are shown oriented at a 0/90 orientation for optimized loading paths due to increased axial stiffness, and hence, increased NVH. In zone 88, located below zone 86, fibers 70 oriented in a 0/90 orientation are optimized for NVH and increased crash energy, while fibers 70 rotated forty-five degrees in a 45/−45 orientation, as shown in zone 90, have increased torsional rigidity.

As subsequent fiber 70 layers having different fiber 70 types, lengths, and/or orientations are placed on top of the illustrated fiber layers 70 of FIG. 4, the performance characteristics described above for the steering support housing 10 may be forever manipulated and modified to achieve a desired combination of attributes. Of course, the fiber orientations for the steering column 50 of FIG. 2 may be optimized similar to what is depicted here to produce an optimized steering column as well.

Figure 5:
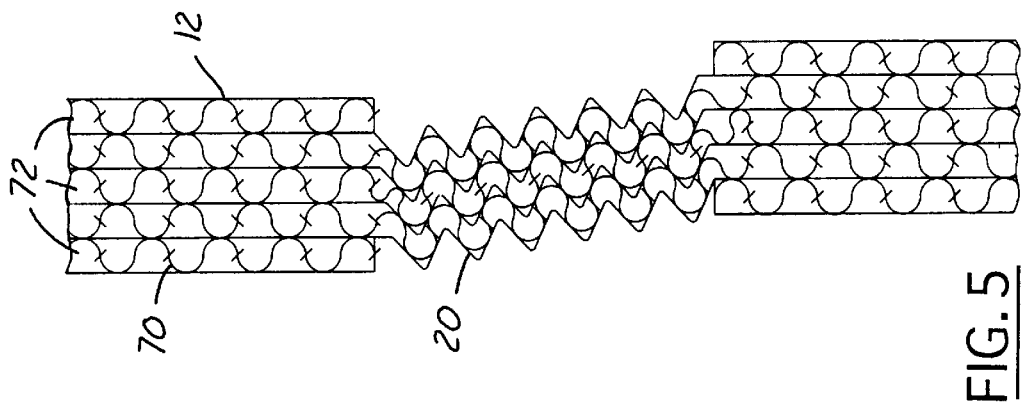
FIG. 5 is a section view of the accordion region of FIG. 4 taken along line 5—5.

Referring now to FIG. 5, a sectional view of the accordion region 20 and a portion of the column tube 12 of FIGS. 1–4 is depicted. The column tube 12 and accordion region 20 each have a plurality of fiber 70 layers of various fiber orientations based upon the performance requirements of the steering support housing 10 as discussed above. The column tube 12 also has at least one additional fiber layer 72 stacked on top of the fiber 70 layers. These additional fiber layers 72 provide more strength for the column tube 12, while allowing the accordion region 20 to telescope or tilt easily.

Referring now to FIGS. 6 and 7, a close-up view and side view of one preferred embodiment of the mounting hole 16 of FIGS. 1–4 is depicted. As best seen in FIG. 6, the fiber pattern 70 of all of the fiber 70 layers is preferably circular in close proximity around the mounting hole 16 to provide stiffness and lower NVH. In addition, the fiber 70 layers near the hole 16 may be co-molded with fillers (not shown). Alternatively, a polymeric washer 74 may be coupled within the inner periphery of the mounting hole 16 to provide additional dampening characteristics at the mounting hole 16 location. Preferably, the polymeric washer 74 is comprised of an elastomeric polymeric material.

Figure 8:
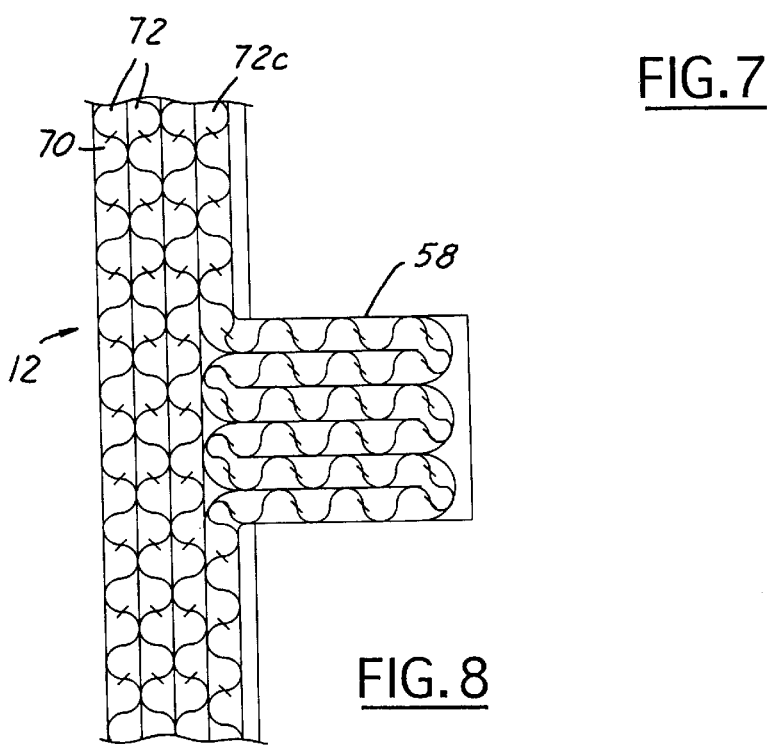
FIG. 8 is a partial view of the protruding region of FIG. 3 taken along line 8—8.

Referring now to FIG. 8, a close-up view of fiber orientation of the fiber layers 74 of the protruding region 58 of FIG. 3 is depicted. The fiber 70 contained in the top fiber layer 76 of the column tube 12 is looped a number of times to form the protruding region 58 that is used to stabilize the support housing 10 to the instrument panel 18. As the number of loops of fiber 70 within the protruding region 58 increases, the strength of the protruding region 58 to resist breakaway from the instrument panel during a crash situation correspondingly increases. Preferably, approximately 2–10 loops of the fiber 70 are contained within the protruding region 58.

Figure 9A:
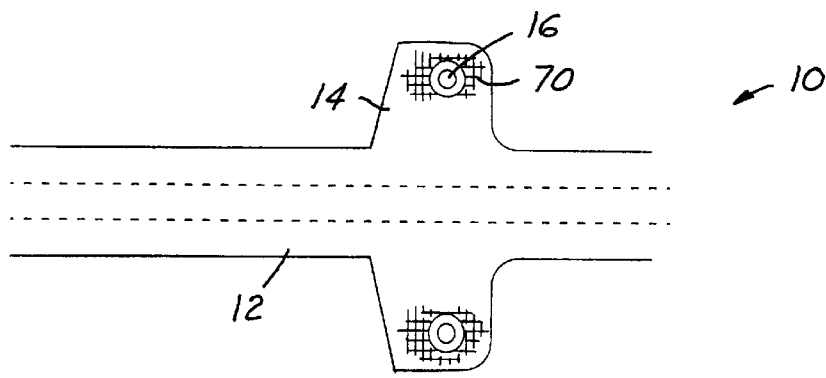
FIGS. 9A and 9B show an outer view of FIG. 2 both before and after a forward crash.
Figure 9B:
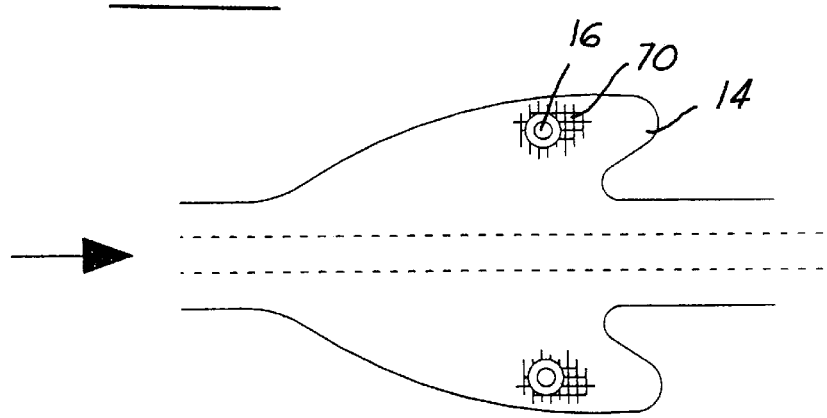

One important characteristic of the composite support housing 10 of the present invention concerns crash energy management. FIGS. 9A and 9B show a steering column support housing 10 as in FIG. 1 immediately prior to and after a crash situation. While the steering column support housing 10 in FIG. 1 is depicted below, one would expect similar results for a column in FIG. 2, with the additional crash energy feature of the breakaway protrusion region 58 to add another stage in the multi-stage crash energy management depicted.

Referring now to FIGS. 9A and 9B, a close-up view of the support housing 10 of FIG. 1 is shown prior to and after the crash. After the crash, first the fiber 70 layers within the mounting structures 14 collapse forward and deform around the mounting holes 16 to dissipate crash energy. The mounting holes 16 containing the mounting attachment (not shown) remain stationary and in effect act as the crush initiators. Although not shown, if necessary, the accordion region 20 having the accordion style design can compress into itself or into the forward parts of the column tube 12 to further dissipate crash energy. Finally, depending upon the amount of energy in the crash, the mounting attachments contained in the mounting holes 16 can break away to further dissipate crash energy. In effect, the composite support housing 10 of FIG. 1 has a multi-stage crash energy dissipation mechanism.

Figure 10:
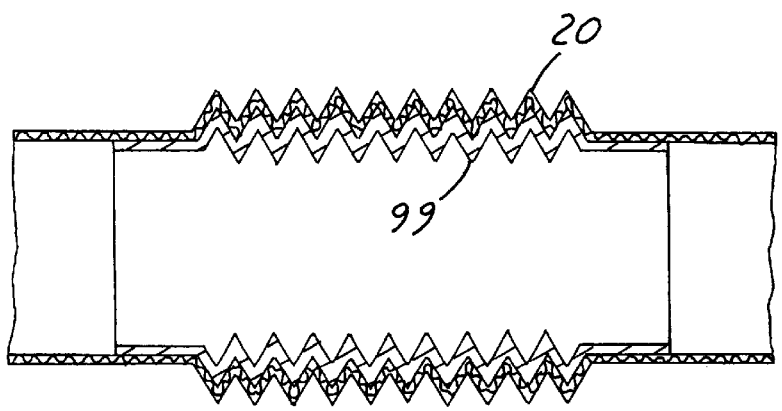
FIG. 10 is a section view of another preferred embodiment of the present invention in which a noncomposite insert is added within an accordion region.

In yet another preferred embodiment, as depicted in FIG. 10, a non-composite insert 99 is coupled within the accordion region 20 of the composite support housing 10. This insert 99 is preferably made of steel or other high strength material known in the art and functions to provide additional stiffness to the accordion region 20 and to prevent shaft buckling during load situations.

While the invention has been described in terms of preferred embodiments, it will be understood, of course, that the invention is not limited thereto since modifications may be made by those skilled in the art, particularly in light of the foregoing teachings.

What is claimed is:

1. A steering column support housing comprising:
    a composite column tube; and
    a composite mounting structure having a mounting hole, wherein said composite column tube and said composite mounting structure each have a plurality of fibers layered within a matrix material, wherein the type and length of said plurality of fibers, along with an orientation of each layer of said plurality of fibers within said matrix material, and a composition of said matrix material are optimized for at least one of a plurality of steering column support housing performance characteristics;
    wherein said composite column tube has a protruding region coupled within an inlet of an instrument panel wherein at least one layer of said plurality of fibers contained within said composite column tube is looped within said protruding region.

2. The steering column support housing of claim 1, wherein said plurality of steering column support housing performance characteristics is selected from the group consisting of NVH, structural stiffness, load path optimization, crash energy management optimization, mass balance optimization, and cost.

3. The steering column support housing of claim 1, wherein said composite column tube is mounted to an instrument panel through said mounting hole.

4. The steering column support housing of claim 1, wherein said column tube is mounted to an engine compartment wall through said mounting hole.

5. The steering column support housing of claim 1, wherein said composite column tube and said composite mounting structure are integrally formed.

6. The steering column support housing of claim 1, wherein said plurality of fibers is selected from the group consisting of a plurality of continuous fibers and a plurality of short-length fibers.

7. The steering column support housing of claim 1, wherein said plurality of fibers is selected from the group consisting of a plurality of carbon fibers, a plurality of graphite fibers, a plurality of glass fibers, and a plurality of aramid fibers.

8. The steering column support housing of claim 1, wherein said composition of said matrix material is selected from the group consisting of a moldable thermosetting polymer and a moldable thermoplastic polymer, wherein said moldable thermosetting polymer and said moldable thermoplastic polymer each exhibit good strength and processability.

9. The steering column support housing of claim 1, wherein the orientation of adjacent layers of said plurality of fibers is selected from the group consisting of a 0/90 fiber orientation and a +45/−45 fiber orientation relative to a plane running through the surface of said composite column tube.

10. The steering column support housing of claim 1, wherein the fiber orientation of said plurality of fibers around said at least one mounting hole comprises a circular fiber pattern.

11. The steering column support housing of claim 1 further comprising a filler material, said filler material located in close proximity to said at least one mounting hole for improving the dampening characteristics of the steering column support housing.

12. The steering column support housing of claim 1, wherein one of said at least one mounting holes has an elastomeric washer coupled to its inner periphery for improving the dampening characteristics of the steering column support housing.

13. The steering column support housing of claim 1, wherein said composite column tube has an accordion region capable of telescoping or tilting.

14. The steering column support housing of claim 13, further comprising a non-composite insert coupled within said accordion region.

15. A method of forming a steering system for use in a vehicle comprising the steps of:
   forming a composite column tube and a composite mounting structure from a plurality of fibers layered within a matrix material, wherein the type and length of said plurality of fibers, alone with an orientation of each layer of said plurality of fibers within said matrix material, and a composition of said matrix material are optimized for at least one of a plurality of steering column support housing performance characteristics said plurality of steering column support housing performance characteristics selected from the group consisting of NVH, structural stiffness, load path optimization, crash energy management optimization, mass balance optimization, and cost, wherein said composite column tube has a protruding region, wherein at least one layer of said plurality of fibers contained within said composite column tube is looped within said protruding region;
   coupling said composite column tube to said composite mounting structure to form a composite steering column support housing;
   coupling a steering mechanism within an interior region of said composite steering column support housing; and
   coupling a said composite steering column support housing within the vehicle.

16. The method of claim 15, wherein the steps of forming a composite steering column support housing comprises the steps of:
   forming a composite column tube from a plurality of first fibers layered within a first matrix material, wherein said composite column tube has a protruding region, wherein at least one layer of said plurality of first fibers contained within said composite column tube is looped within said protruding region;
   forming a composite mounting structure from a second plurality of fibers layered within a second matrix material,
   wherein the type and length of said plurality of fibers, along with an orientation of each layer of said plurality of fibers within said first matrix material, and
   a composition of said first matrix material are optimized for at least one of a plurality of steering column support housing performance characteristics;
   wherein the type and length of said second plurality of fibers, along with an orientation of each layer of said second plurality of fibers within said second matrix material, and a composition of said second matrix material are optimized for at least one of said plurality of steering column support housing performance characteristics;
   said plurality of steering column support housing performance characteristics selected from the group consisting of NVH, structural stiffness, load path optimization, crash energy management optimization, mass balance optimization, and cost; and
   coupling said composite column tube to said composite mounting structure to a composite steering column support housing.

17. The method of claim 15, wherein the step of coupling said composite mounting structure to the vehicle comprises the step of coupling said composite mounting structure through an integrally formed mounting hole to a first portion of the vehicle, where said first portion is selected from the group consisting of an instrument panel and an engine block.

18. The method of claim 15, wherein the step of coupling said composite column tube within the vehicle comprises the steps of:
   coupling said protruding region of said composite column tube to a corresponding inlet of an instrument panel; and
   coupling said composite mounting structure to an engine block of the vehicle through a mounting hole.

19. A steering column support housing comprising:
   a composite column tube having an accordion region capable of telescoping or tilting;
   a non-composite insert coupled within said accordion region; and
   a composite mounting structure having a mounting hole, wherein said composite column tube and said composite mounting structure each have a plurality of fibers layered within a matrix material, wherein the type and length of said plurality of fibers, along with an orientation of each layer of said plurality of fibers within said matrix material, and a composition of said matrix material are optimized for at least one of a plurality of steering column support housing performance characteristics.

20. The steering column support housing of claim 19, wherein said plurality of steering column support housing performance characteristics is selected from the group consisting of NVH, structural stiffness, load path optimization, crash energy management optimization, mass balance optimization, and cost.

21. The steering column support housing of claim 19, wherein said composite column tube is mounted to an instrument panel through said mounting hole.

22. The steering column support housing of claim 19, wherein said column tube is mounted to an engine compartment wall through said mounting hole.

23. The steering column support housing of claim 19, wherein said composite column tube and said composite mounting structure are integrally formed.

24. The steering column support housing of claim 19, wherein said composite column tube has a protruding region coupled within an inlet of an instrument panel, wherein at least one layer of said plurality of fibers contained within said composite column tube is looped within said protruding region.

25. The steering column support housing of claim 19, wherein said plurality of fibers is selected from the group consisting of a plurality of continuous fibers and a plurality of short-length fibers.

26. The steering column support housing of claim 19, wherein said plurality of fibers is selected from the group consisting of a plurality of carbon fibers, a plurality of graphite fibers, a plurality of glass fibers, and a plurality of aramid fibers.

27. The steering column support housing of claim 19, wherein said composition of said matrix material is selected from the group consisting of a moldable thermosetting polymer and a moldable thermoplastic polymer, wherein said moldable thermosetting polymer and said moldable thermoplastic polymer each exhibit good strength and processability.

28. The steering column support housing of claim 19, wherein the orientation of adjacent layers of said plurality of fibers is selected from the group consisting of a 0/90 fiber orientation and a +45/−45 fiber orientation relative to a plane running through the surface of said composite column tribe.

29. The steering column support housing of claim 19, wherein the fiber orientation of said plurality of fibers around said at least one mounting hole comprises a circular fiber pattern.

30. The steering column support housing of claim 19 further comprising a filler material, said filler material located in close proximity to said at least one mounting hole for improving the dampening characteristics of the steering column support housing.

31. The steering column support housing of claim 19, wherein one of said at least one mounting holes has an elastomeric washer coupled to its inner periphery for improving the dampening characteristics of the steering column support housing.

* * * * *